E. N. MORLEY.
Improvement in Wheels for Vehicles.
No. 132,310. Patented Oct. 15, 1872.
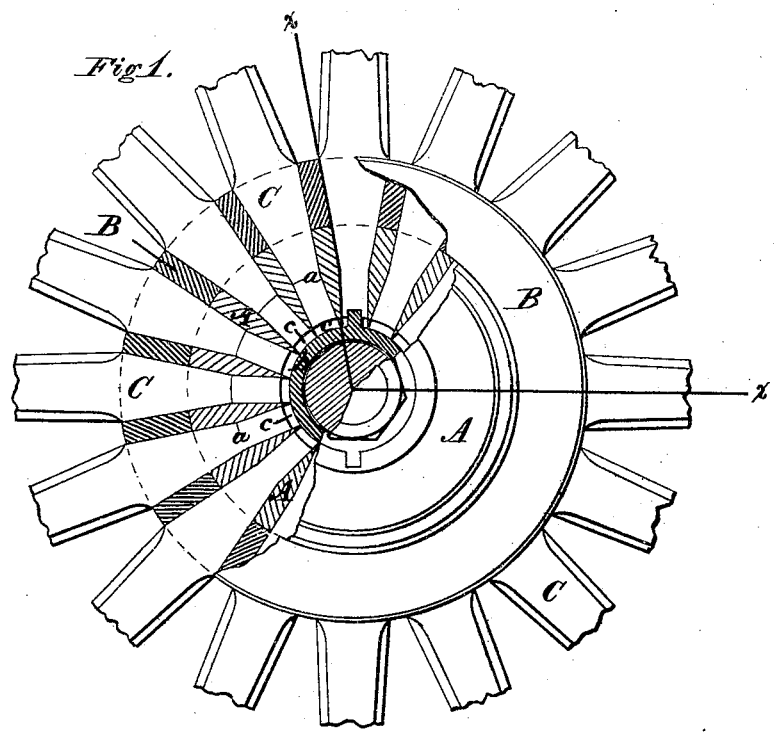
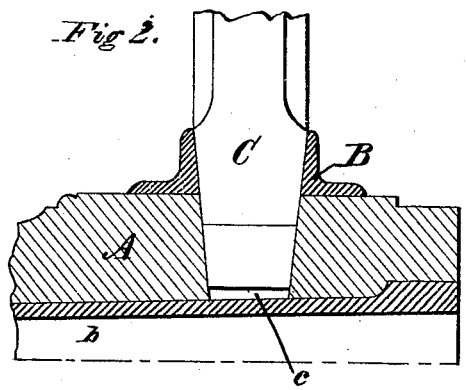

UNITED STATES PATENT OFFICE.

EDWARD N. MORLEY, OF WILMINGTON, DELAWARE.

IMPROVEMENT IN WHEELS FOR VEHICLES.

Specification forming part of Letters Patent No. 132,310, dated October 15, 1872.

*To all whom it may concern:*

Be it known that I, EDWARD N. MORLEY, of Wilmington, in the county of New Castle and State of Delaware, have invented certain Improvements in Carriage-Wheels, of which the following is a specification, reference being had to the accompanying drawing.

My invention consists in an improvement in carriage-wheels, as hereinafter more fully explained.

Figure 1 represents a side elevation of my invention with a portion in section, and Fig. 2 represents a vertical section of a portion of same cut through line $x$ $x$ of Fig. 1.

In the construction of carriages heretofore the spokes were generally formed with shoulders, which rested upon the outer periphery of the wooden hub. In these cases the spokes were liable to snap or break off at the shoulders, and when loose there was no provision made for tightening them, as the shoulders on the spokes prevented this being done.

In my invention I encircle the hub A with a metal band, B, with openings through it to correspond with the mortise-holes in the hub. Into these openings I insert the spokes C, with inclined or beveled faces extending down through the metal band and into the wooden hub as far as the line $a$ $a$ in Fig. 1, when they make a slight angle, and are extended with parallel faces until within a short distance of the outer periphery of the "box," when they terminate, leaving recesses $c$, as shown in Fig. 1. These recesses are provided for the purpose of tightening the spokes when they become loose by allowing their being driven into the hub; otherwise, by being extended so as to abut against the iron box, they could not be driven in and thus tightened. I also bevel or incline the two edges of the spokes either all the way through, as shown in Fig. 2, or only a part of the way, as in the case of the two faces above described. These edges are beveled for the purpose of facilitating the tightening of the spokes when they become loose along their edges.

By this method of constructing my wheels it will be seen that in shrinking the tire the spokes are forced into the hub, and, being in wedge-form, are firmly and rigidly held in place.

I am aware that wheels have been made in which the spokes were tapered all the way from the outer edge of the metal band to their inner ends; but such do not leave sufficient strength to the inner ends of the spokes. I am also aware that wheels have been made in which the spokes were tapered as far as the metal band extended, and were then made straight all the way to their inner ends; and therefore I do not claim these; but What I do claim as my invention is—

A carriage-wheel in which the spokes are tapered where they pass through the metal band B, and for about half their depth in the hub, with their inner ends of uniform thickness, as herein shown and described.

EDWARD N. MORLEY.

Witnesses:
 THOS. JOHNSON,
 JOSEPH McMAKIN.